(12) United States Patent
Kosal et al.

(10) Patent No.: US 7,290,828 B2
(45) Date of Patent: *Nov. 6, 2007

(54) BAFFLE SYSTEM

(75) Inventors: David J. Kosal, Richmond, MI (US); Kevin Hicks, Harrison Township, MI (US); David Carlson, Rochester Hills, MI (US); Michael J. Czaplicki, Rochester, MI (US); Serge Bieber, Haegen (FR); Dominique Busseuil, Lux (FR)

(73) Assignee: Zephyros, Inc., Romeo, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/143,068

(22) Filed: Jun. 2, 2005

(65) Prior Publication Data
US 2005/0194706 A1    Sep. 8, 2005

Related U.S. Application Data

(63) Continuation of application No. 10/941,553, filed on Sep. 15, 2004.

(60) Provisional application No. 60/504,260, filed on Sep. 18, 2003.

(51) Int. Cl.
*B29C 44/06* (2006.01)
*B60R 27/00* (2006.01)

(52) U.S. Cl. .............. 296/187.02; 264/46.5; 264/46.6; 264/273; 428/71

(58) Field of Classification Search .......... 264/46.5, 264/46.6, 257, 273; 428/71; 277/644, 645; 296/187.02
See application file for complete search history.

(56) References Cited

U.S. PATENT DOCUMENTS

| | | | |
|---|---|---|---|
| 1,814,677 A | 7/1931 | Fennema |
| 3,400,182 A | 9/1968 | Kolt |
| 3,615,974 A | 10/1971 | Graff |
| 4,029,128 A | 6/1977 | Yamagishi |
| 4,269,890 A | 5/1981 | Breitling et al. |
| 4,463,870 A | 8/1984 | Coburn, Jr. et al. |
| 4,610,836 A | 9/1986 | Wycech |
| 4,751,249 A | 6/1988 | Wycech |
| 4,769,391 A | 9/1988 | Wycech |
| 4,810,548 A | 3/1989 | Ligon, Sr. et al. |

(Continued)

FOREIGN PATENT DOCUMENTS

CA    913319    10/1972

(Continued)

OTHER PUBLICATIONS

Copending U.S. Appl. No. 10/718,509, filed Nov. 20, 2003.

(Continued)

*Primary Examiner*—Allan R. Kuhns
(74) *Attorney, Agent, or Firm*—Dobrusin & Thennisch PC (57) ABSTRACT

There is disclosed a system and method of employing a porous container for sealing, baffling, reinforcing or a combination thereof. According to the method, a porous container having one or more openings is provided. An expandable material is associated with the container and is preferably placed within the container. Thereafter, the expandable material is expanded to contact and adhere to a structure of an article of manufacture (e.g., an automotive vehicle).

21 Claims, 6 Drawing Sheets

U.S. PATENT DOCUMENTS

| | | |
|---|---|---|
| 4,813,690 A | 3/1989 | Coburn, Jr. |
| 4,822,011 A | 4/1989 | Goldbach et al. |
| 4,836,516 A | 6/1989 | Wycech |
| 4,853,270 A | 8/1989 | Wycech |
| 4,861,097 A | 8/1989 | Wycech |
| 4,923,902 A | 5/1990 | Wycech |
| 4,978,562 A | 12/1990 | Wycech |
| 5,102,188 A | 4/1992 | Yamane |
| 5,124,186 A | 6/1992 | Wycech |
| 5,213,391 A | 5/1993 | Takagi |
| 5,242,637 A * | 9/1993 | Inoue et al. ............... 264/45.3 |
| 5,358,397 A | 10/1994 | Ligon et al. |
| 5,506,025 A | 4/1996 | Otto et al. |
| 5,631,027 A | 5/1997 | Takabatake |
| 5,642,914 A | 7/1997 | Takabatake |
| 5,755,486 A | 5/1998 | Wycech |
| 5,878,784 A | 3/1999 | Sales et al. |
| 5,888,600 A | 3/1999 | Wycech |
| 5,892,187 A | 4/1999 | Patrick |
| 5,904,024 A | 5/1999 | Miwa |
| 5,931,474 A | 8/1999 | Chang et al. |
| 5,958,315 A * | 9/1999 | Fatato et al. ............... 264/46.6 |
| 5,985,435 A | 11/1999 | Czaplicki et al. |
| 5,992,923 A | 11/1999 | Wycech |
| 6,003,274 A | 12/1999 | Wycech |
| 6,006,484 A | 12/1999 | Geissbuhler |
| 6,033,300 A | 3/2000 | Schneider |
| 6,068,424 A | 5/2000 | Wycech |
| 6,079,180 A | 6/2000 | Wycech |
| 6,092,864 A | 7/2000 | Wycech et al. |
| 6,093,358 A | 7/2000 | Schiewe et al. |
| 6,096,403 A | 8/2000 | Wycech et al. |
| 6,099,948 A | 8/2000 | Paver, Jr. |
| 6,103,341 A | 8/2000 | Barz et al. |
| 6,129,410 A | 10/2000 | Kosaraju et al. |
| 6,131,897 A | 10/2000 | Barz et al. |
| 6,149,227 A | 11/2000 | Wycech |
| 6,150,428 A | 11/2000 | Hanley, IV et al. |
| 6,165,588 A | 12/2000 | Wycech |
| 6,168,226 B1 | 1/2001 | Wycech |
| 6,189,953 B1 | 2/2001 | Wycech |
| 6,196,621 B1 | 3/2001 | VanAssche |
| 6,199,940 B1 | 3/2001 | Hopton et al. |
| 6,233,826 B1 | 5/2001 | Wycech |
| 6,237,304 B1 | 5/2001 | Wycech |
| 6,247,287 B1 | 6/2001 | Takabatake |
| 6,253,524 B1 | 7/2001 | Hopton et al. |
| 6,263,635 B1 | 7/2001 | Czaplicki |
| 6,267,436 B1 | 7/2001 | Takahara |
| 6,270,600 B1 | 8/2001 | Wycech |
| 6,272,809 B1 | 8/2001 | Wycech |
| 6,276,105 B1 | 8/2001 | Wycech |
| 6,281,260 B1 | 8/2001 | Hanley, IV et al. |
| 6,287,666 B1 | 9/2001 | Wycech |
| 6,296,298 B1 | 10/2001 | Barz |
| 6,305,136 B1 | 10/2001 | Hopton et al. |
| 6,311,452 B1 | 11/2001 | Barz et al. |
| 6,315,938 B1 | 11/2001 | Jandali |
| 6,319,964 B1 | 11/2001 | Blank et al. |
| 6,321,793 B1 | 11/2001 | Czaplicki et al. |
| 6,332,731 B1 | 12/2001 | Wycech |
| 6,341,467 B1 | 1/2002 | Wycech |
| 6,358,584 B1 | 3/2002 | Czaplicki |
| 6,368,438 B1 | 4/2002 | Chang et al. |
| 6,372,334 B1 | 4/2002 | Wycech |
| D457,120 S | 5/2002 | Broccardo et al. |
| 6,382,635 B1 * | 5/2002 | Fitzgerald ................... 277/630 |
| 6,383,610 B1 | 5/2002 | Barz et al. |
| 6,389,775 B1 | 5/2002 | Steiner et al. |
| 6,406,078 B1 | 6/2002 | Wycech |
| 6,413,611 B1 * | 7/2002 | Roberts et al. ............... 428/99 |
| 6,419,305 B1 | 7/2002 | Larsen |
| 6,422,575 B1 | 7/2002 | Czaplicki et al. |
| H2047 H | 9/2002 | Harrison et al. |
| 6,455,146 B1 | 9/2002 | Fitzgerald |
| 6,467,834 B1 | 10/2002 | Barz et al. |
| 6,471,285 B1 | 10/2002 | Czaplicki et al. |
| 6,474,722 B2 | 11/2002 | Barz |
| 6,474,723 B2 | 11/2002 | Czaplicki et al. |
| 6,475,577 B1 | 11/2002 | Hopton |
| 6,478,367 B2 | 11/2002 | Ishikawa |
| 6,482,486 B1 | 11/2002 | Czaplicki et al. |
| 6,482,496 B1 | 11/2002 | Wycech |
| 6,502,821 B2 | 1/2003 | Schneider |
| 6,519,854 B2 | 2/2003 | Blank |
| 6,523,857 B1 | 2/2003 | Hopton et al. |
| 6,523,884 B2 | 2/2003 | Czaplicki et al. |
| 6,546,693 B2 | 4/2003 | Wycech |
| 6,561,571 B1 | 5/2003 | Brennecke |
| 6,575,526 B2 | 6/2003 | Czaplicki et al. |
| 6,585,202 B2 | 7/2003 | Broccardo et al. |
| 6,691,468 B2 | 2/2004 | Helferty |
| 6,708,979 B2 | 3/2004 | Stratman et al. |
| 6,722,720 B2 | 4/2004 | Donick et al. |
| 6,811,864 B2 | 11/2004 | Czaplicki et al. |
| 6,846,559 B2 | 1/2005 | Czaplicki et al. |
| 6,851,232 B1 | 2/2005 | Schwegler |
| 6,855,652 B2 | 2/2005 | Hable et al. |
| 6,880,657 B2 | 4/2005 | Schneider et al. |
| 6,887,914 B2 | 5/2005 | Czaplicki et al. |
| 6,890,021 B2 | 5/2005 | Bock et al. |
| 6,905,745 B2 | 6/2005 | Sheldon et al. |
| 6,920,693 B2 | 7/2005 | Hankins et al. |
| 6,921,130 B2 | 7/2005 | Barz et al. |
| 6,969,551 B2 | 11/2005 | Richardson et al. |
| 7,004,536 B2 | 2/2006 | Wieber |
| 7,011,315 B2 | 3/2006 | Czaplicki et al. |
| 7,025,409 B2 | 4/2006 | Riley et al. |
| 7,041,193 B2 | 5/2006 | Bogert et al. |
| 7,077,460 B2 | 7/2006 | Czaplicki et al. |
| 7,141,194 B1 | 11/2006 | Beckmann |
| 7,141,206 B2 | 11/2006 | Ishikawa et al. |
| 7,144,071 B2 | 12/2006 | Le Gall et al. |
| 2002/0053179 A1 | 5/2002 | Wycech |
| 2002/0074827 A1 | 6/2002 | Fitgerald et al. |
| 2002/0096833 A1 | 7/2002 | Czaplicki et al. |
| 2002/0164450 A1 | 11/2002 | Lupini et al. |
| 2002/0174954 A1 | 11/2002 | Busseuil et al. |
| 2003/0001469 A1 | 1/2003 | Hankins et al. |
| 2003/0039792 A1 | 2/2003 | Hable et al. |
| 2003/0050352 A1 | 3/2003 | Guenther et al. |
| 2003/0057737 A1 | 3/2003 | Bock et al. |
| 2003/0062739 A1 | 4/2003 | Bock |
| 2003/0069335 A1 | 4/2003 | Czaplicki et al. |
| 2003/0140671 A1 | 7/2003 | Lande et al. |
| 2003/0176128 A1 | 9/2003 | Czaplicki et al. |
| 2003/0183317 A1 | 10/2003 | Czaplicki et al. |
| 2003/0184121 A1 | 10/2003 | Czaplicki et al. |
| 2003/0201572 A1 | 10/2003 | Coon et al. |
| 2003/0209921 A1 | 11/2003 | Coon et al. |
| 2003/0218019 A1 | 11/2003 | Le Gall et al. |
| 2004/0018341 A1 | 1/2004 | Richardson et al. |
| 2004/0018353 A1 | 1/2004 | Czaplicki et al. |
| 2004/0034982 A1 | 2/2004 | Wieber et al. |
| 2004/0036317 A1 | 2/2004 | Kleino |
| 2004/0046423 A1 | 3/2004 | Wieber |
| 2004/0056472 A1 | 3/2004 | Schneider |
| 2004/0076831 A1 | 4/2004 | Hable et al. |
| 2004/0084141 A1 | 5/2004 | Czaplicki |
| 2004/0112531 A1 | 6/2004 | Bogert et al. |
| 2004/0124553 A1 | 7/2004 | Czaplicki et al. |
| 2004/0140587 A1 | 7/2004 | Hadley |
| 2004/0143969 A1 | 7/2004 | Czaplicki et al. |
| 2004/0212220 A1 | 10/2004 | Riley et al. |

| | | | |
|---|---|---|---|
| 2004/0217626 A1 | 11/2004 | Barz et al. | |
| 2004/0227377 A1 | 11/2004 | Gray | |
| 2004/0256888 A1 | 12/2004 | Le Gall et al. | |
| 2004/0262810 A1 | 12/2004 | Barz et al. | |
| 2004/0262853 A1 | 12/2004 | Larsen et al. | |
| 2005/0012280 A1 | 1/2005 | Richardson | |
| 2005/0016807 A1 | 1/2005 | Braymand | |
| 2005/0017543 A1 | 1/2005 | Riley et al. | |
| 2005/0081383 A1 | 4/2005 | Kosal et al. | |
| 2005/0082111 A1 | 4/2005 | Weber | |
| 2005/0087899 A1 | 4/2005 | Coon et al. | |
| 2005/0102815 A1 | 5/2005 | Larsen | |
| 2005/0126286 A1 | 6/2005 | Hable et al. | |
| 2005/0126848 A1 | 6/2005 | Siavoshai et al. | |
| 2005/0127145 A1 | 6/2005 | Czaplicki et al. | |
| 2005/0159531 A1 | 7/2005 | Ferng | |
| 2005/0166532 A1 | 8/2005 | Barz | |
| 2005/0249916 A1 | 11/2005 | Muto et al. | |
| 2005/0249936 A1 | 11/2005 | Ui et al. | |
| 2005/0279567 A1 | 12/2005 | Ito | |
| 2005/0285292 A1 | 12/2005 | Mendiboure et al. | |
| 2006/0000186 A1 | 1/2006 | Carlson et al. | |
| 2006/0006695 A1 | 1/2006 | Lutz et al. | |
| 2006/0008615 A1 | 1/2006 | Muteau et al. | |
| 2006/0019595 A1 | 1/2006 | Lewis et al. | |
| 2006/0020076 A1 | 1/2006 | Finerman et al. | |
| 2006/0021697 A1 | 2/2006 | Riley et al. | |
| 2006/0043772 A1 | 3/2006 | Richardson | |
| 2006/0057333 A1 | 3/2006 | Brahim | |
| 2006/0061115 A1 | 3/2006 | Brennecke | |
| 2006/0065483 A1 | 3/2006 | Thomas | |
| 2006/0267378 A1 | 11/2006 | Czaplicki et al. | |

FOREIGN PATENT DOCUMENTS

| | | |
|---|---|---|
| DE | 21 47 063 A | 5/1972 |
| DE | 3826011 A1 | 2/1990 |
| DE | 38 38 655 | 5/1990 |
| DE | 40 28 895 C1 | 2/1992 |
| DE | 4039135 | 6/1992 |
| EP | 0 268 416 A | 5/1988 |
| EP | 0 383 498 B1 | 3/1993 |
| EP | 0 611 778 A3 | 1/1994 |
| EP | 0 891 918 A1 | 1/1999 |
| EP | 0 893 331 A1 | 1/1999 |
| EP | 0 893 332 A1 | 1/1999 |
| EP | 1 134 126 B1 | 3/2001 |
| EP | 1 031 496 B1 | 12/2001 |
| EP | 0 893 332 B1 | 3/2002 |
| EP | 1 208 954 A2 | 5/2002 |
| EP | 1 362 769 A1 | 11/2003 |
| EP | 1 428 744 | 6/2004 |
| EP | 1 471 105 A2 | 10/2004 |
| EP | 1 475 295 A2 | 11/2004 |
| EP | 1 299 497 B1 | 12/2004 |
| EP | 1 591 224 A1 | 2/2005 |
| EP | 1 157 916 B1 | 10/2005 |
| EP | 1 591 224 | 11/2005 |
| EP | 1 458 594 B1 | 3/2006 |
| EP | 1 666 228 A2 | 6/2006 |
| FR | 2 539 693 A1 | 7/1984 |
| GB | 2 083 162 A | 3/1982 |
| JP | 59-214628 | 12/1984 |
| JP | 61-205109 | 9/1986 |
| JP | 63-231913 | 9/1988 |
| JP | 01 164 867 | 6/1989 |
| JP | 3-197743 | 8/1991 |
| JP | 4-158009 | 6/1992 |
| JP | 10-45031 | 2/1998 |
| JP | 10053156 | 2/1998 |
| JP | 10-71628 | 3/1998 |
| JP | 2000-52444 | 2/2000 |
| JP | 2001-62833 | 3/2001 |
| JP | 2001-199362 | 7/2001 |
| JP | 02001191949 A | 7/2001 |
| JP | 2002331960 | 11/2002 |
| JP | 2002-362412 | 12/2002 |
| WO | WO 93/05103 | 9/1992 |
| WO | WO 95/32110 | 5/1995 |
| WO | WO 97/02967 | 1/1997 |
| WO | WO 96/22324 | 5/1997 |
| WO | WO 97/43501 | 11/1997 |
| WO | WO 98/50221 | 5/1998 |
| WO | WO 98/36944 | 8/1998 |
| WO | WO 99/08854 | 2/1999 |
| WO | WO 99/28575 | 6/1999 |
| WO | WO 99/50057 | 10/1999 |
| WO | WO00/02747 | 1/2000 |
| WO | WO 00/13958 | 3/2000 |
| WO | WO 00/37239 | 6/2000 |
| WO | WO 00/40815 | 7/2000 |
| WO | WO 00/43254 | 7/2000 |
| WO | WO 00/46461 | 8/2000 |
| WO | WO 01/54936 | 8/2000 |
| WO | WO 00/55444 | 9/2000 |
| WO | WO 01/19667 | 3/2001 |
| WO | WO 01/71225 | 9/2001 |
| WO | WO 01/83206 | 11/2001 |
| WO | WO 03/042024 A1 | 5/2003 |
| WO | WO 03/051676 | 6/2003 |
| WO | WO 03/093387 | 11/2003 |
| WO | WO 2004/078451 | 9/2004 |
| WO | WO 2004/113153 | 12/2004 |
| WO | WO2005/077634 A2 | 8/2005 |
| WO | WO2005/080524 | 9/2005 |
| WO | WO2005/105405 | 11/2005 |
| WO | WO2005/113689 | 12/2005 |

OTHER PUBLICATIONS

Hopton et al., Application of a Structrual Reinforcing Material to Imrove Vehicle NVH Characteristics, 1999.

Lilley et al., Comparison of Preformed Acoustic Baffles and Two-Component Polyurethan Foams for Filling Body Cavities, 2001.

Lilley et al., A Comparison of NVH Treatments for Vehicle Floorplan Applications, 2001.

Lilley et al., Vehicle Acoustic Solutions, 2003.

Mansour et al., Optimal Bonding Thickness for Vehicle Stiffness, 2001.

International Search Report dated Dec. 15, 2004. PCT/2004/030187.1001.143WO.

* cited by examiner

Fig-7 ns a brief description:
BAFFLE SYSTEM

CLAIM OF BENEFIT OF FILING DATE

This application is a continuation of copending application number 10/941,553 filed on Sep. 15, 2004, which is a non-provisional of application number 60/504,260 filed on Sep. 18, 2003.

FIELD OF THE INVENTION

The present invention relates generally to a baffle for an article of manufacture such as an automotive vehicle.

BACKGROUND OF THE INVENTION

For many years, industry (e.g., the transportation industry) has been concerned with designing systems for sealing, reinforcing or baffling structures of articles of manufacture (e.g., automotive vehicles). Such systems can include a carrier, an expandable material or both. It is generally desirable for such systems to be relatively inexpensive. It is also typically desirable for such systems to be relatively easy to form. Moreover, it is typically desirable for such systems to be easily assembled to an article of manufacture such as an automotive vehicle. Thus, the present invention seeks to provide an improved system and method for sealing, reinforcing or baffling wherein the system, the method or both exhibit one or more of the aforementioned desirable characteristics or other desirable characteristics.

SUMMARY OF THE INVENTION

Accordingly, there is provided a baffling system that includes a structure of an article of manufacture such as an automotive vehicle, the structure defining a cavity. The system also includes a baffle that includes a first wall opposing a second wall and a foam material, the baffle being located within the cavity of the structure. The first wall is typically substantially oarallel to the second wall with open space there between. The baffle includes a peripheral wall that extends about perimeters of the first and second walls. The baffle is typically located within the cavity of the structure such that the peripheral wall opposes and corresponds to walls of the structure. The foam material typically adheres the baffle in place to the walls of the structure.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE PREFERRED EMBODIMENT

The present invention is predicated upon providing an improved system for sealing, baffling or reinforcing one or more members of an article of manufacture. The system has found particular utility for automotive vehicles although it is contemplated that the system may be applied to a variety of articles of manufacture such as airplanes, boats, buildings, furniture or the like.

Accordingly, the system of the present invention typically includes one or more of the following:

1) a structure (e.g., a pillar structure) of an article of manufacture (e.g., an automotive vehicle), the structure preferably having one or more walls at least partially defining a cavity;

2) a porous container at least partially defining an internal open space, the porous container having one or more openings for providing fluid communication between the internal open space and an environment surrounding the container; and 3) an expandable material disposed within the internal open space of the porous container wherein the container and the expandable material are located adjacent the structure (e.g., within the cavity) such that the expandable material expands to contact the structure (e.g., the one or more walls defining the cavity).

Referring to FIGS. 1-4, there is illustrated one exemplary preferred embodiment of a system 10 being formed in accordance with the present invention. The system 10 is provided for purposes of illustration of the present invention. It is contemplated that alternatives to the components and aspects of the system 10 of FIGS. 1-4 may be employed in the practice of the present invention. Some of those alternatives are disclosed below, however, the skilled artisan will appreciate that many other alternatives may also be employed as well in the practice of the present invention.

Figures 1, 2:
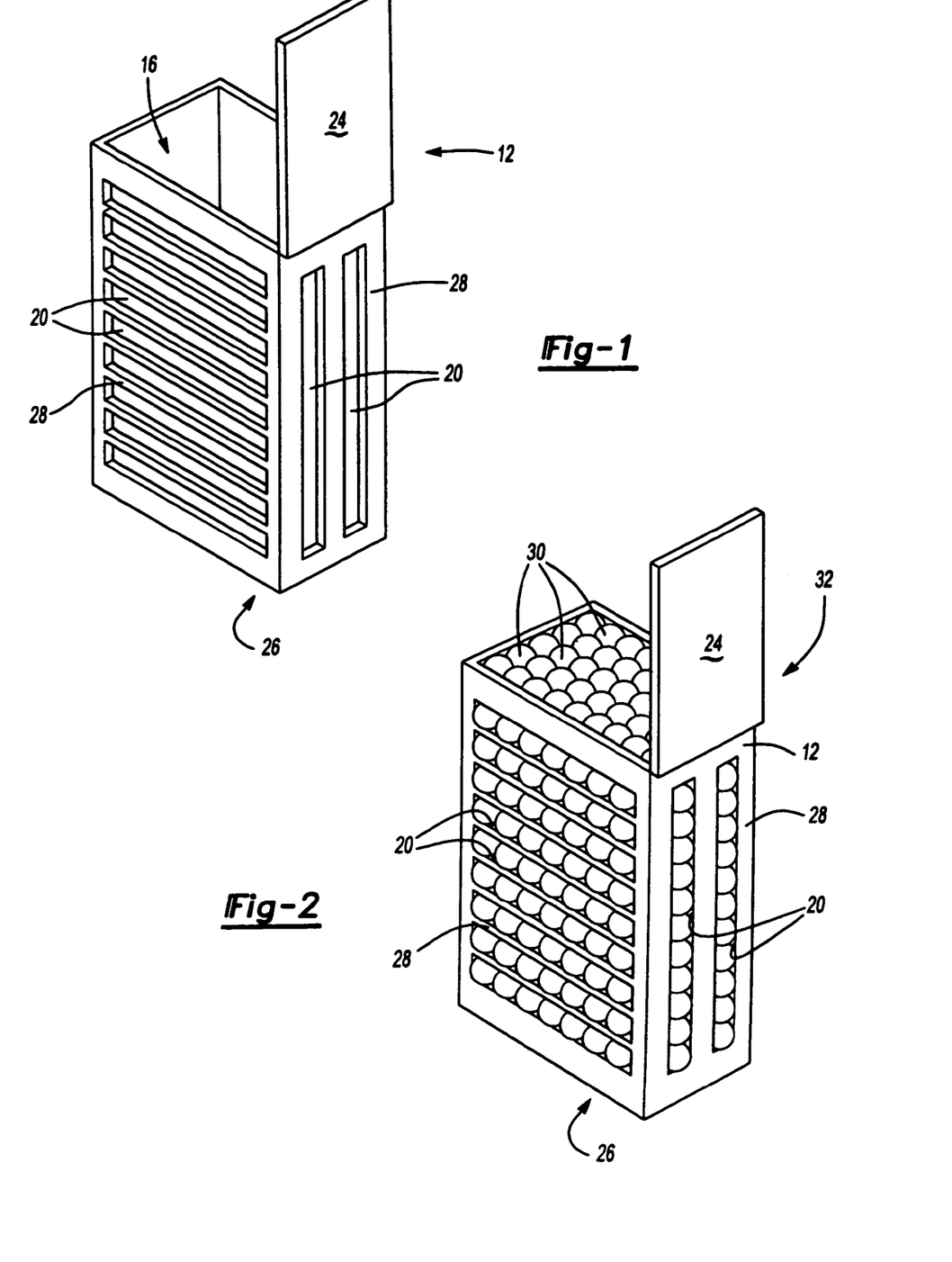
FIG. 1 is a perspective view of an exemplary container suitable for forming a system according to the present invention.
FIG. 2 is a perspective view of the container of FIG. 1 filled with pellets of expandable material for forming an exemplary sealing, baffling or reinforcing member in accordance with the present invention.

The system 10 typically includes a porous container. In FIG. 1, there is illustrated an exemplary porous container 12 at least partially defining an internal open space 16. The container 12 includes at least one opening 20, but preferably include a plurality of openings 20 for providing fluid communication between the internal open space 16 and an external environment surrounding the container 12.

In the particular embodiment shown, the container 12 is configured as a box with a top or first end wall 24, a bottom or second end wall 26 and multiple (e.g., four) side walls 28 extending between the top wall 24 and bottom wall 26. Each of the walls 24-28 is illustrated as substantially rectangular. The top wall 24 and bottom wall 26 are substantially continuous or non-porous and the openings 20 are configured as elongated slots extending between side edges or top and bottom edges of the side walls. The top wall 24 is at least partially formed by a lid, which can be opened and closed.

The container 12 is shown as being formed of a relatively rigid material. The material is preferably a thermoset or thermoplastic material that is able to withstand temperature experienced during automobile manufacture (e.g., painting or coating processes). One preferred material is a polymeric material such as a polyamide (e.g., nylon 6,6). Advantageously, such a material may be processed using a variety of different techniques such as molding (e.g., compression molding, injection molding, blow molding, gas injection molding or the like), extruding or other techniques for forming the container 12.

While the container 12 illustrated is considered to be a preferred container for use in the present invention, it is contemplated that a variety of alternatively configured containers may be employed within the scope of the present invention. As an initial matter, the container may be shaped as desired or needed depending upon the intended application for the container. As an example, the container may be designed with angles, shapes, contours or the like, which correspond to angles, shapes, contours or the like of a structure of an article of manufacture or cavity thereof that the container is intended to be adjacent or within. Alternatively, the container can be shaped such that it may be placed adjacent or within a variety of differently shaped members or cavities.

As one exemplary alternative embodiment, the container may be substantially cylindrical with a top wall, a bottom wall and a side wall extending between the top wall and the bottom wall. Preferably, the top and bottom wall are substantially round (e.g., circular, elliptical, oval or the like) and the side wall is substantially annular. Also, it is preferred, although not required, that the top and bottom wall be continuous or non-porous while the side wall preferably includes one or a plurality of openings (e.g., vertically extending slots).

It is also contemplated that the container may be formed of a variety of materials, which may be flexible, semi-rigid or rigid. As examples, the container may be formed of polymeric materials, metals (e.g., aluminum, steel, magnesium, combinations thereof or the like), fabrics, fibrous materials combinations thereof or the like. Exemplary, polymeric materials (e.g., thermoplastics, rubber, thermosets or the like), which may be configured as sheets, fabrics or the like include, without limitation, polyester, polypropylene, polyamide, polyethylene, polyvinylchloride, polyethylene, combinations thereof or the like).

Particularly, for flexible or semi-rigid materials, it is contemplated that a portion or the entire container may be formed of flexible walls to assist in allowing the container to adapt or correspond to walls and contours of a member of an article of manufacture. In one example, a perforated bag (e.g., a mesh bag) having multiple openings (e.g., throughholes) is employed as the container. In another example, the container includes a rigid or semi-rigid bottom and/or top wall that are substantially continuous or non-porous and a flexible porous material (e.g., a fabric) comprising one or more side walls for the carrier.

In one embodiment, it is desirable for the material of the container to be able to withstand automotive vehicle processing temperatures (e.g., e-coat or paint processing oven or bath temperatures as further discussed herein) without any deformation or any substantial deformation. However, in another embodiment, the material of the container may be configured to deform or be deformable at such temperatures.

For example, it is contemplated that the material may be or may become stretchable at such temperatures or other temperatures and expansion of the expandable material may cause such stretching.

Once the container has been provided, an expandable material is preferably placed within the container thereby forming a member for baffling, sealing and/or reinforcing an article of manufacture. As can be seen in FIG. 2, a plurality of pellets 30 of the expandable material has been placed within the open space 16 of the container 12 to form such a member 32. Preferably, the pellets 30 are large enough to prevent their passage through the openings 20 at least while they are in a substantially solid state. Advantageously, the expandable material is often supplied in the form of pellets such that further processing of the expandable material is not required. Of course, it is contemplated that the expandable material may be processed if desired or needed.

Figure 4:
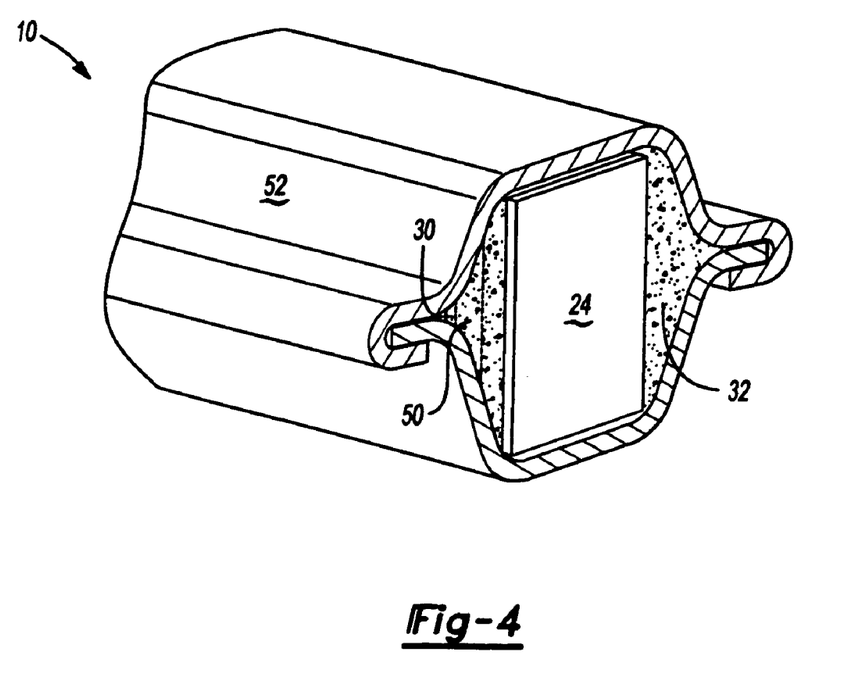
FIG. 4 is a perspective view of the exemplary system of FIG. 3 after expansion of the expandable material.
Figure 4A:
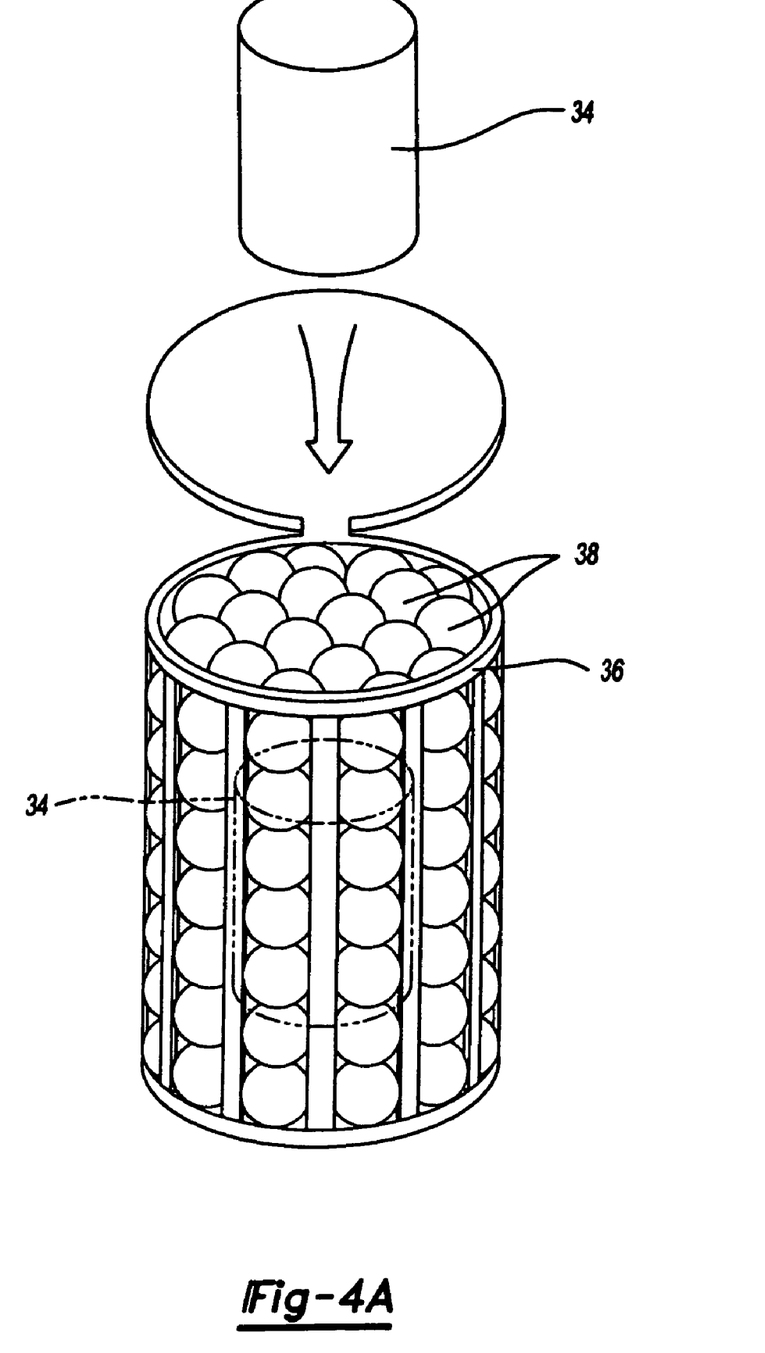
FIG. 4A is a perspective view of an exemplary member being formed in accordance with the present invention.

In any of the disclosed embodiments, it is contemplated that one or more structures may be placed within the open space of the container such that the expandable material does not need to fill as much space. As an example, FIG. 4A illustrates a hollow structure 34 such as a plastic cylindrical structure being inserted into a cylindrical container 36. Preferably, pellets 38 of expandable material are arranged to surround the structure 34 while in the container 36.

While the expandable material is configured as pellets in FIG. 2, the expandable material may be placed within any container of the present invention in a variety of different configurations. For example, the expandable material may be provided as a single mass or as multiple masses and the masses may be identical or non-identical with respect to each other.

Preferably, the expandable material is a heat activated material having foamable characteristics. The material may be generally dry to the touch or tacky and can be placed within or adjacent the container in any form of desired pattern, placement, or thickness. Exemplary expandable materials include L-5248, L-7002 and L-5204 foams available through L&L Products, Inc. of Romeo, Mich.

Though other heat activated materials are possible for the expandable material, a preferred heat activated material is an expandable plastic, and preferably one that is foamable. Particularly preferred materials are an epoxy-based and EVA (Ethylene Vinyl Acetate) based structural, sealing, baffling or sound-absorbing foams. For example, and without limitation, the structural foam may be an epoxy-based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules.

A number of reinforcing, sealing and/or baffling foams are known in the art and may also be used to produce foam. A typical foam includes a polymeric base material, such as an epoxy resin, an ethylene-based polymer, an acrylate and/or acetate based material or a combination thereof which, when compounded with appropriate ingredients (typically a blowing and curing agent), expands and cures in a reliable and predictable manner upon the application of heat or the occurrence of a particular ambient condition. From a chemical standpoint for a thermally-activated material, the structural foam is usually initially processed as a flowable thermoplastic material before curing. It will cross-link upon curing, which makes the material incapable of further flow.

Examples of preferred foam formulations are EVA based and epoxy-based materials that are commercially available from L&L Products of Romeo, Mich., under the designations L5206, L5207, L5208, L5209, L5218, L5224, L-5248, XP321 and XP721. One advantage of the preferred foam materials over prior art materials is that the preferred materials can be processed in several ways. The preferred materials can be processed by injection molding, extrusion, compression molding, application with a mini-applicator, pelletization of the like. This enables the formation and creation of part designs that exceed the capability of most prior art materials. In one preferred embodiment, the structural foam (in its uncured state) is generally is dry or relatively free of tack to the touch.

While the preferred materials for fabricating the expandable material have been disclosed, the material can be formed of other materials provided that the material selected is heat-activated or otherwise activated by an ambient condition (e.g. moisture, pressure, time or the like) and cures in a predictable and reliable manner under appropriate conditions for the selected application. One such material is the epoxy based resin disclosed in U.S. Pat. No. 6,131,897, the teachings of which are incorporated herein by reference, filed with the United States Patent and Trademark Office on Mar. 8, 1999 by the assignee of this application. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. See also, U.S. Pat. Nos. 5,766,719; 5,755,486; 5,575,526; and 5,932,680, (incorporated by reference). In general, it is desirable for the expandable material to have good corrosion resistance properties. Still another desirable expandable material, which includes one or more acrylates, one or more acetates or a combination thereof is disclosed in U.S. provisional patent application Ser. No. 60/482,897 filed Jun. 26, 2003, incorporated herein by reference for all purposes.

In applications where the expandable material is a heat activated, thermally expanding material, an important consideration involved with the selection and formulation of the material comprising the foam is the temperature at which a material reaction or expansion, and possibly curing, will take place. For instance, in most applications, it is undesirable for the material to be reactive at room temperature or otherwise at the ambient temperature in a production line environment. More typically, the expandable material becomes reactive at higher processing temperatures, such as those encountered in an automobile assembly plant, when the foam is processed along with automobile components at elevated temperatures or at higher applied energy levels, e.g., during painting preparation steps. While temperatures encountered in an automobile assembly operation may be in the range of about 148.89° C. to 204.44° C. (about 300° F. to 400° F.), body and paint shop applications are commonly about 93.33° C. (about 200° F.) or higher. If needed, blowing agent activators can be incorporated into the composition to cause expansion at different temperatures outside the above ranges or expansion at different rates or to different degrees.

Generally, suitable expandable foams have a range of expansion ranging from approximately 0 to over 1000 percent. The level of expansion of the expandable material may be increased to as high as 1500 percent or more. In still other embodiments, it is contemplated that the expandable material expands to at least 2000%, 2500%, 3000% or more relative to its original non-expanded size. Typically, strength is obtained from products that possess low expansion while baffling and/or sound absorption is obtained through-greater expansion.

In another embodiment, the expandable material is provided in an encapsulated or partially encapsulated form, which may comprise a pellet, which includes an expandable foamable material, encapsulated or partially encapsulated in an adhesive shell. An example of one such system is disclosed in commonly owned, co-pending U.S. application Ser. No. 09/524,298 ("Expandable Pre-Formed Plug"), hereby incorporated by reference.

In addition, as discussed previously, preformed patterns may also be employed such as those made by extruding a sheet (having a flat or contoured surface) and then die cutting it according to a predetermined configuration in accordance with the chosen container or structure, and applying it thereto.

The skilled artisan will appreciate that the system may be employed in combination with or as a component of a conventional sound blocking baffle, or a vehicle structural reinforcement system, such as is disclosed in commonly owned co-pending U.S. application Ser. Nos. 09/524,961 or 09/502,686 (hereby incorporated by reference).

Assembly of the member (i.e., the container with the expandable material) to a structure typically includes placement and/or securing of the member adjacent to the structure. Thereafter, the expandable material is activated to expand and, upon expansion, at least a portion of the expandable material travels through the one or more openings of the container to contact one or more surfaces or walls of the structure. Upon cooling, the expandable material, now expanded, cures and adheres or attaches the container and the expandable material to the one or more surfaces or walls.

Figure 3:
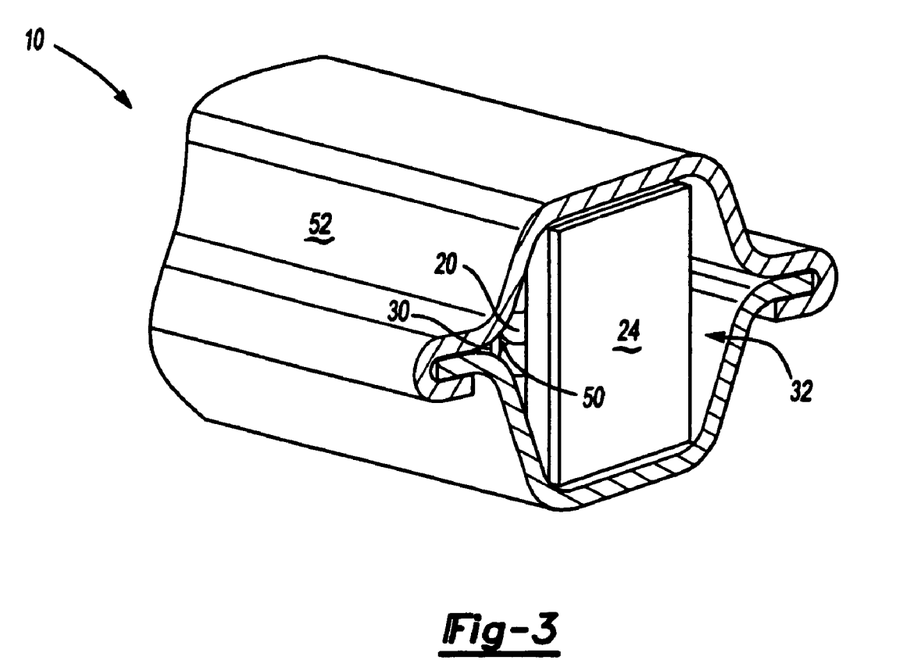
FIG. 3 is a perspective view of the member of FIG. 2 located in a cavity of a pillar of an automotive vehicle for forming an exemplary system in accordance with the present invention.

In FIG. 3, the member 32 has been placed within a cavity 50 defined by one or more walls of an automotive pillar structure 52 to form the system 10. In the embodiment shown, the member 32 has been placed in the cavity 50 bottom first such that the top and bottom wall 24, 26 are perpendicular or substantially perpendicular (i.e., within 30°, more preferably within 20°, and even more preferably within 10° of perpendicular) relative to the one or more walls of the structure 52. Of course, it is contemplated that one of the side walls 28 or the top wall 24 may be inserted in the cavity 50 first such that the member 32 is otherwise arranged in the cavity.

The member 32 illustrated has been secured within the cavity 50 by interference fitting the container 12 against the walls of the structure 52 defining the cavity 50. In alternative embodiments and depending on the container 12 and structure 52, however, the member 32 may be, at least temporarily, attached to or adjacent a structure using a variety of techniques. For example, and without limitation, fasteners (e.g., screws, rivets, arrowhead fasteners, adhesives, magnets, interference fit fasteners, hooks, push-pins or others) may be employed to secure the member 32 in a desired location relative to the structure.

Upon activation, the pellets 30 of expandable material expand, combine and travel through the openings 20 to contact the one or more walls of the structure 52. Upon cooling, the expandable material adheres to the walls thereby securing the container and the expandable material within the cavity 50. Preferably, the expandable material, the container 12 or both substantially span the entire cross-section of the cavity 50 to prevent passage of materials therethrough.

While the expandable material has been illustrated as being formed of a substantially singular substantially homogeneous material, it is contemplated that various different expandable materials may be employed. For example, a portion of the open space of the container may be filled with a relatively high expansion (e.g., at least about 1000% expansion) material and an adjacent portion (e.g., a portion above or below the original portion) of the open space of the container may be filled with a lower expansion (e.g., less than 1000% expansion) reinforcing material. Thus, a system may be formed to provide substantial acoustic damping and substantial reinforcement.

Figure 5A:
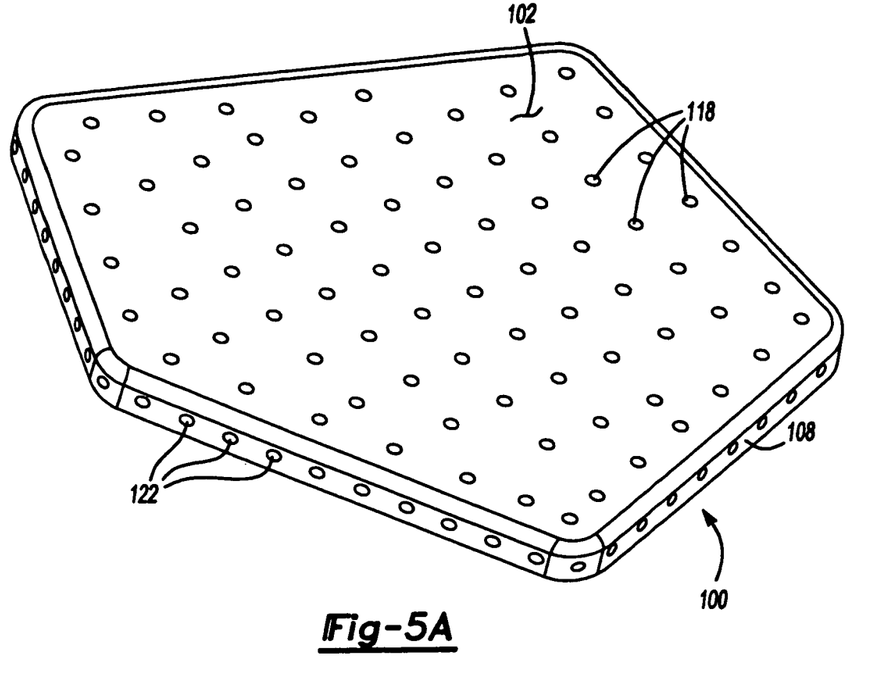
FIG. 5A is a perspective view of an alternative exemplary container suitable for forming a system in accordance with the present invention.
Figure 5B:
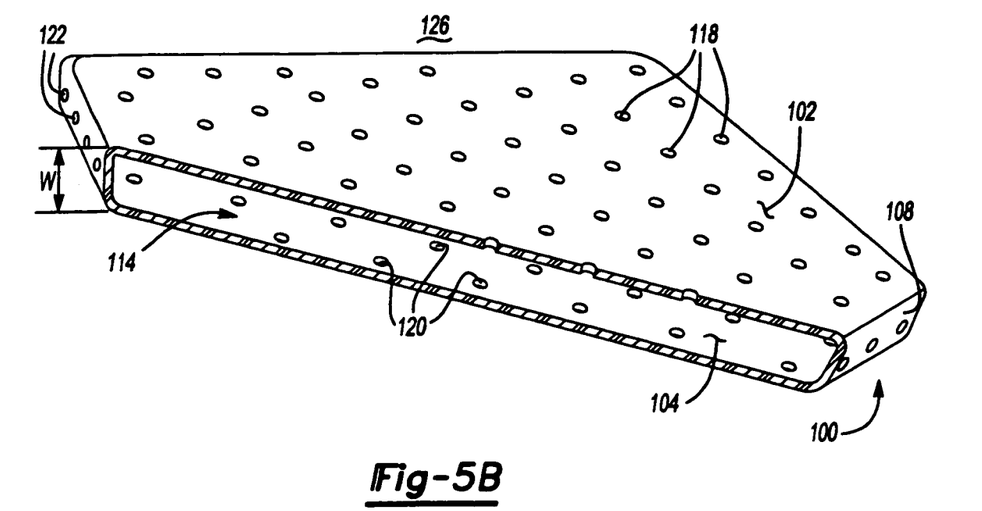
FIG. 5B is a perspective cut-away view of the exemplary container of FIG. 5A.

Referring to FIGS. 5A and 5B, there is illustrated another exemplary container 100 suitable for forming a system according to the present invention. The container 100 includes a first wall 102 opposing and preferably substantially parallel to a second wall 104. A peripheral wall 108 extends about the outer perimeters of the first and second walls 102, 104 such that the first wall 102, 104 is spaced apart from the second wall 104. Preferably, the peripheral wall 108 has a width (W) of between about between about 0.1 cm and about 5 cm, more preferably between about 0.3 cm and about 2 cm and even more preferably between about 0.6 cm and about 1.2 cm such that the first wall 102 is spaced from the second wall 104 by approximately than width (W). Cooperatively, the first wall 102, the second wall 104 and the peripheral wall 108 substantially define an internal open space 114.

In the embodiment shown, each of the walls 102, 104, 108 respectively includes a plurality of openings 118, 120, 122 (e.g., through-holes) extending between the open space 114 and an environment 126 surrounding the container 100. Preferably, each of the openings 118 of the first wall 102 are spaced apart from each other by distances of between about 0.3 cm and about 10 cm, more preferably between about 0.6 cm and about 5 cm and even more preferably between about 0.8 cm and about 2.0 cm. It is also preferable for each of the openings 120 of the second wall 104 to be spaced apart from each other by the same distances suggested for the openings 118 of the first wall 102. The openings 122 of the peripheral wall 122 are preferably spaced apart from each other by distances of between about 0.1 cm and about 5 cm, more preferably between about 0.3 cm and about 2 cm and even more preferably between about 0.6 cm and about 1.2 cm.

The openings 118, 120, 122 preferably have diameters of between about 0.1 cm to about 2.0 cm, more preferably between about 0.2 cm and about 1.0 cm, and even more preferably between about 0.3 cm and about 0.5 cm. As used herein, the term diameter with respect to the plurality of openings 118, 120, 122, any distance spanning across a largest dimension of an opening extending in a direction substantially parallel with the wall or member that defines the opening.

The open space 114 is preferably at least partially or substantially filled with the expandable material as described herein. The expandable material may be provided as pellets, as a singular piece of material or otherwise as described herein. The expandable material may be located within the open space 114 by molding the container 100 about the expandable material or by placement of the material in the open space 114 after formation of the container 100 (e.g., where the container 100 is made of two or more parts, which can be fastened together).

For forming a system (e.g., a baffling system) according to the present invention, the container 100 and expandable material are placed in a cavity of a structure (e.g., a pillar structure) in a manner similar to that described in relation to the container 12 of FIGS. 1-4 (e.g., interference fit or fastened). The container 100 of FIGS. 5A and 5B, is preferably placed in a structure such that the peripheral wall 108 opposes and corresponds to walls of the structure. Thus, upon activation of the expandable material, the expandable material expands and flows through the openings 122 of the peripheral wall 108 to contact the walls of the structure. Upon curing, the expandable material preferably adheres the container 100 in place to the walls of the structure. It is also preferable that the expandable material flows through the openings 118, 120 of the first and second walls 102, 104 for forming a foam coating over the outer surface of one or both of the walls 102, 104.

Figure 6A:
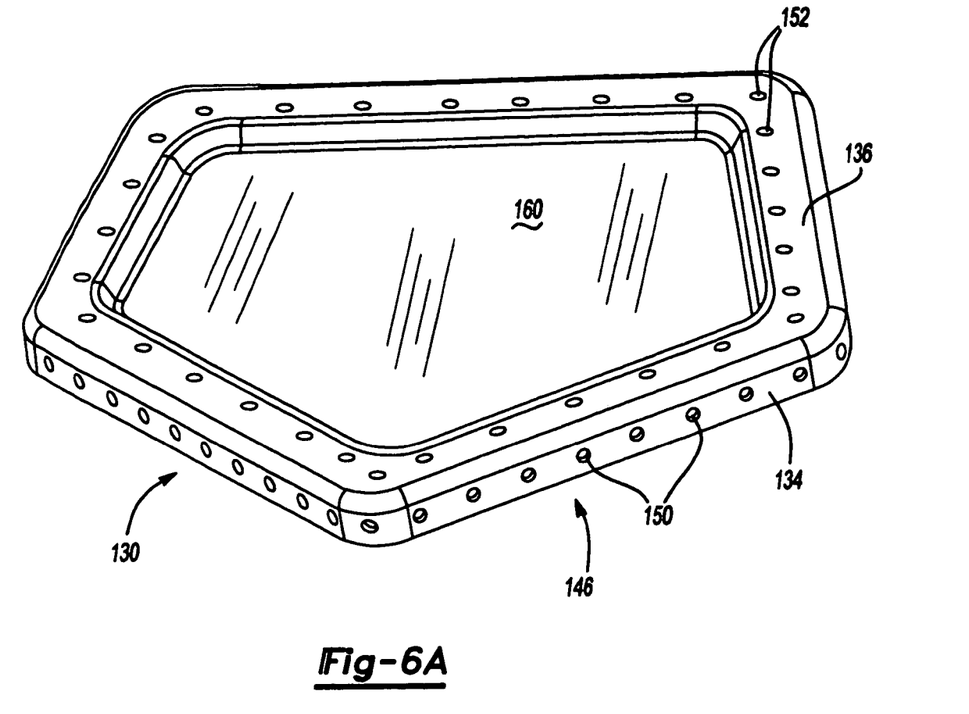
FIG. 6A is a perspective view of another alternative exemplary container suitable for forming a system in accordance with the present invention.
Figure 6B:
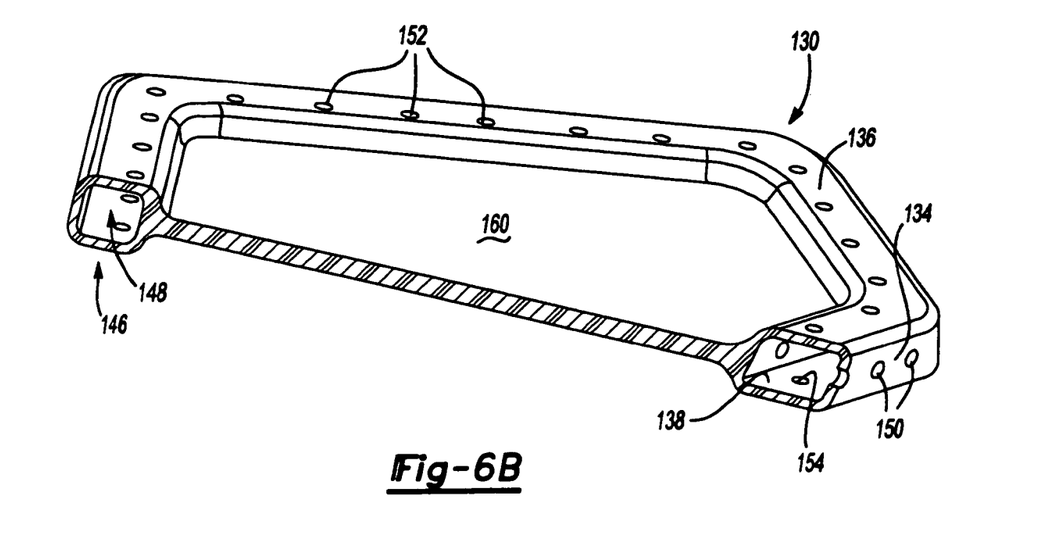
FIG. 6B is a perspective cut-away view of the exemplary container of FIG. 6A.

Referring to FIGS. 6A and 6B, there is illustrated an alternative container 130 having a similar configuration to the container 100 of FIGS. 5A and 5B. The container 130 includes a peripheral wall 134 substantially identical to the peripheral wall 108 of FIGS. 5A and 5B. The peripheral wall 134 along with a first wall 136, a second wall 138 and an internal wall 140 form a peripheral tubular structure 146. The peripheral wall 134, and the first and second walls 136, 138 respectively include openings 150, 152, 154 that are arranged and sized in a manner substantially identical to that described for the peripheral wall 108 and the first and second walls 102, 104 of the container 100 of FIGS. 5A and 5B.

A spanning wall 160 substantially continuously spans an area internal of the tubular structure 146 wherein the area and the wall 160 are substantially surrounded by the tubular structure 146. Of course, the spanning wall 160 may be discontinuous as it spans the area as well and the tubular structure 146 may only partially surround the spanning wall 160.

Expandable material my be located in the open space 148 of the container 130 and the container 130 of FIGS. 6A and 6B may be placed within a structure in the same manner as described with respect to the container 100 of FIGS. 5A and 5B and the expandable material may be activated to expand and flow to adhere the material and the container 130 in place in a manner substantially identical to that described for the container 100 of FIGS. 5A and 5B. It should be noted that additional expandable material may be located upon the spanning wall 160 of the container 130 for providing increased baffling or sound absorption.

Figure 7:
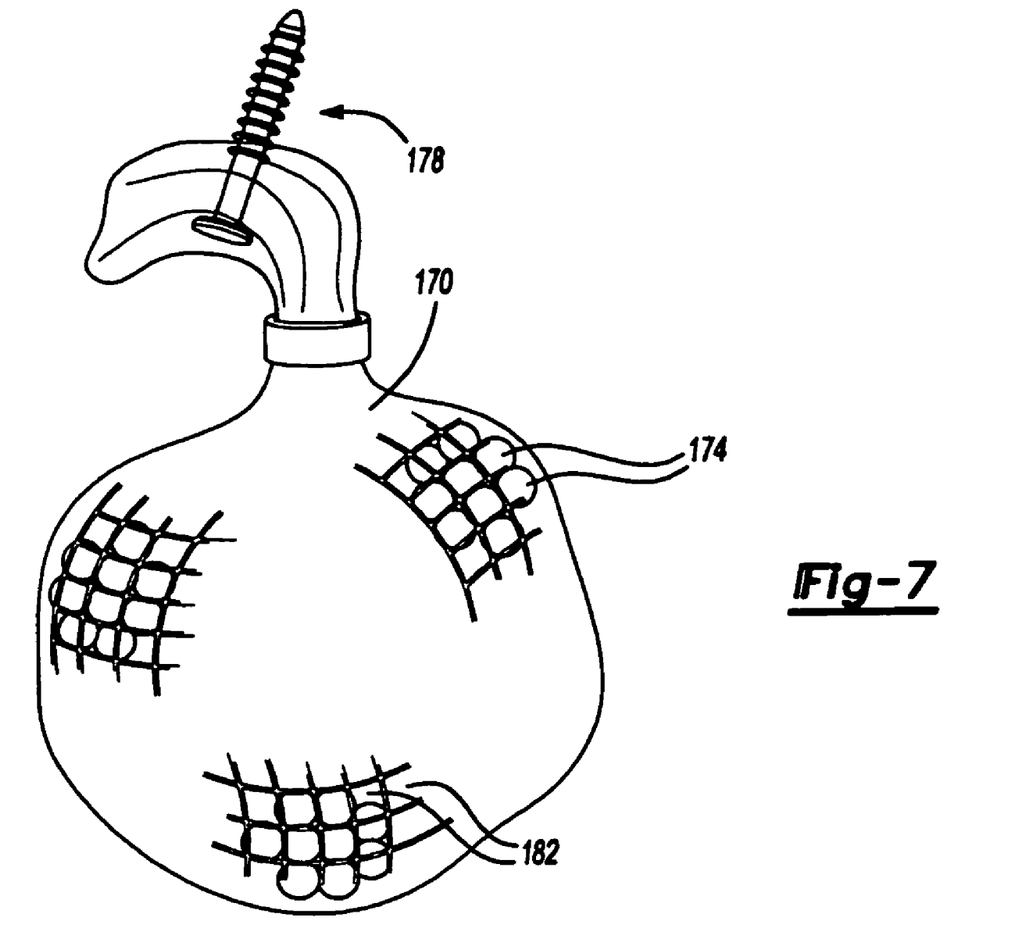
FIG. 7. is a perspective view of yet another alternative exemplary member according to an aspect of the present invention.

Referring to FIG. 7, there is illustrated still another alternative embodiment of the present invention. As shown, a container 170 is formed of a porous fabric or flexible material (e.g., a permeable fabric, a mesh fabric, a perforated fabric or the like) that substantially surrounds pellets 174 of expandable material. A fastener 178 (e.g., a threaded fastener, a mechanical interlock fastener or the like) is attached to the container 170. Preferably, the fastener 178 is extended through the porous container such that the fastener assists in maintaining the container surround the plurality of pellets.

For forming a system according to the present invention, the container 170 with the pellets 174 is held in place with the fastener 178 within a cavity of a structure. In such and embodiment, the fastener 178 may be attached directly to the structure or may be attached to other components of an article of manufacture (e.g., an automotive vehicle). In turn, the expandable material may be activated to expand and flow through openings 182 of the container 170 to contact and wet walls of the structure. Upon curing, the expandable material adheres itself and the container 170 to the walls of the structure. Preferably, the expandable material and the container 170 seal the cavity of the structure against passage of materials therethrough and/or provide sound dampening of baffling within the structure.

Generally, for the various embodiments of the present invention, the walls or materials of the containers, and particularly the walls or materials having the openings, will have a relatively large transmittance for allowing easier flow of the expandable material through the opening. As used herein, the term transmittance refers to the size of the openings relative to the size of the walls or materials of the containers defining those walls. In particular, the transmittance percentage is the amount of area through which the openings will allow passage of expandable material therethrough as opposed to the amount of area of the wall or material that blocks the expandable material. Thus, for example, a wall in a plane with opening extending through 50% of the wall would have a 50% transmittance. Typically, the walls or materials of the present invention will allow for at least 40% transmittance, more typically at least 60% transmittance, even more typically at least 80% transmittance and still more typically at least 90% transmittance.

The actual openings for the container can be relatively small or relatively large to provide relatively small or large pass-through areas. As used herein, pass-through areas are the smallest planar areas of the openings, as entirely defined by the container, through which the expandable material can pass. Exemplary pass through area are typically at least 1 mm$^2$ or less, more typically at least 3 mm$^2$ and even more typically at least 5 mm$^2$ and are typically less than 10 cm$^2$, more typically less than 5 cm$^2$ and even more typically less than 2 cm$^2$.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A baffling system, comprising:
a structure of an automotive vehicle, the structure defining a cavity; and
a baffle that includes a first wall opposing a second wall and a foam material, the baffle being located within the cavity of the structure, wherein:
i. the first wall is substantially parallel to the second wall with open space therebetween;
ii. the baffle includes a peripheral wall that extends substantially continuously and substantially entirely about perimeters of the first and second walls and continuously interconnects the perimeters of the first and second walls as it extends about the perimeters;
iii. the baffle is located within the cavity of the structure such that the peripheral wall opposes and corresponds to walls of the structure about substantially the entire periphery of the baffle; and
iv. the foam material adheres the baffle in place to the walls of the structure, at least a portion of the foam material being between the first and second walls.

2. A baffling system as in claim 1 wherein the first wall and second wall are formed of a molded plastic.

3. A baffling system as in claim 1 wherein the first wall is a top wall, the second wall is a bottom wall and both the first wall and second wall are substantially continuous and non-porous.

4. A baffling system as in claim 1 wherein the foam material extends between the peripheral wall and the walls of the structure.

5. A baffling system as in claim 1 wherein the first wall and second wall are substantially perpendicular to the walls of the structure.

6. A baffling system as in claim 1 wherein the baffle includes a mechanical fastener for interference fitting the baffle to the structure.

7. A baffling system as in claim 1 wherein the foam material, the first wall, the second wall or a combination thereof cooperatively span an entire cross-section of the cavity to prevent passage of materials therethrough.

8. A baffling system as in claim 1 wherein the foam material is a thermoset.

9. A baffling system, comprising:
a structure of an automotive vehicle, the structure defining a cavity wherein the structure is a pillar of an automotive vehicle; and
a baffle that includes a container and a foam material located within the cavity of the structure, wherein:
i. the container includes a first wall opposing a second wall;
ii. the first wall is substantially parallel to the second wall;
iii. the container includes a peripheral wall that extends about perimeters of the first and second walls;
iv. the peripheral wall has a width of between about 0.3 cm and about 2 cm;
v. the first wall is spaced apart from the second wall by approximately the width of the peripheral wall thereby defining an open space therebetween;
vi. the container is located within the cavity of the structure such that the peripheral wall opposes and corresponds to walls of the structure; and
vii. the foam material adheres the container in place to the walls of the structure;
viii. the first wall, second wall and the peripheral wall cooperatively substantially enclose the open space; and
ix. at least a portion of the foam material is located within the open space.

10. A baffling system as in claim 9 wherein the first wall and second wall are formed of a molded plastic material that includes a polyamide and wherein the first wall is a top wall, the second wall is a bottom wall and both the first wall and second wall are substantially continuous and non-porous.

11. A baffling system as in claim 9 wherein the foam material extends between the peripheral wall and the walls of the structure.

12. A baffling system as in claim 9 wherein the first and second walls are within 20° of perpendicular relative to the wall of the structure.

13. A baffling system as in claim 9 wherein the baffle includes a mechanical fastener for interference fitting the baffle to the structure.

14. A baffling system as in claim 9 wherein the foam material, the container or both cooperatively span an entire cross-section of the cavity to prevent passage of materials therethrough.

15. A baffling system as in claim 9 wherein the width is between about 0.6 cm and 1.2 cm.

16. A method of forming a baffling system, the method comprising:
  providing a baffle, the baffle including a container and an expandable material supported by the container, wherein:
  i. the container includes a first wall opposing a second wall;
  ii. the first wall is substantially parallel to the second wall;
  iii. the container includes a peripheral wall that extends about perimeters of the first and second walls and the peripheral wall has a width between about 0.6 cm and 1.2 cm and the peripheral wall continuously interconnects the perimeters of the first and second walls as it extends about the perimeters;
  locating the baffle within a cavity of the structure of an automotive vehicle such that the peripheral wall opposes and corresponds to walls of the structure;
  expanding the expandable material to form a foam material that adheres the container in place to the walls of the structure, at least a portion of the expandable material being located between the first wall and the second wall.

17. A method as in claim 16 wherein the step of expanding the expandable material includes exposing the expandable material to an elevated temperature by placing the baffle in an e-coat oven.

18. A method as in claim 16 wherein the baffle includes a mechanical fastener and wherein the step of locating the baffle within the cavity includes attaching the mechanical fastener at least temporarily to the structure of the automotive vehicle prior to the step of expanding the expandable material.

19. A method as in claim 16 wherein the first wall is spaced apart from the second wall by approximately the width of the peripheral wall and define an open space therebetween.

20. A method as in claim 16 wherein the expandable material expands over 500% relative to its original non-expanded size.

21. A system as in claim 9 wherein peripheral wall continuously interconnects the perimeters of the first and second walls as it extends about the perimeters.

* * * * *